Nov. 21, 1967    H. B. BEBB ETAL    3,354,405
ENERGY COUPLING DEVICE

Filed Aug. 24, 1962    2 Sheets-Sheet 1

INVENTORS
HERBERT B. BEBB
ROBERT J. POTTER

BY Robert E. Sandt
AGENT

Nov. 21, 1967  H. B. BEBB ETAL  3,354,405
ENERGY COUPLING DEVICE
Filed Aug. 24, 1962  2 Sheets-Sheet 2
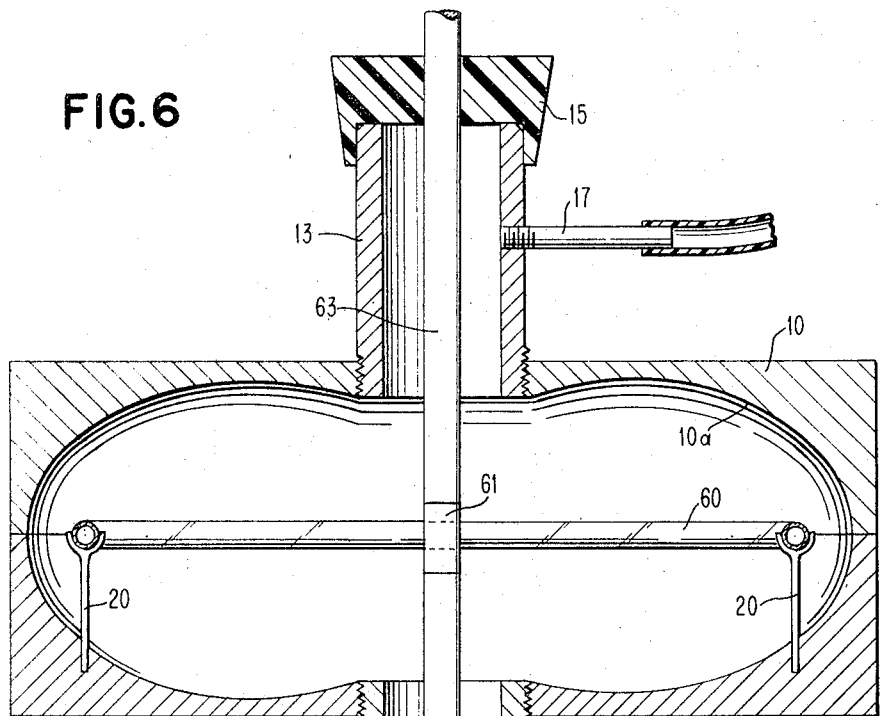
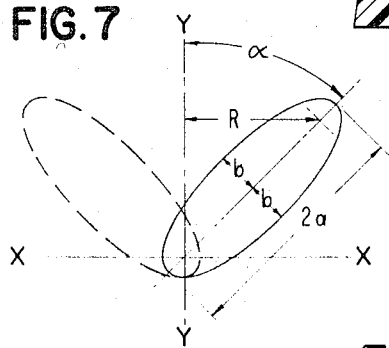
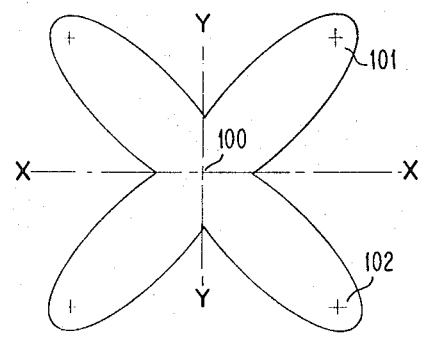
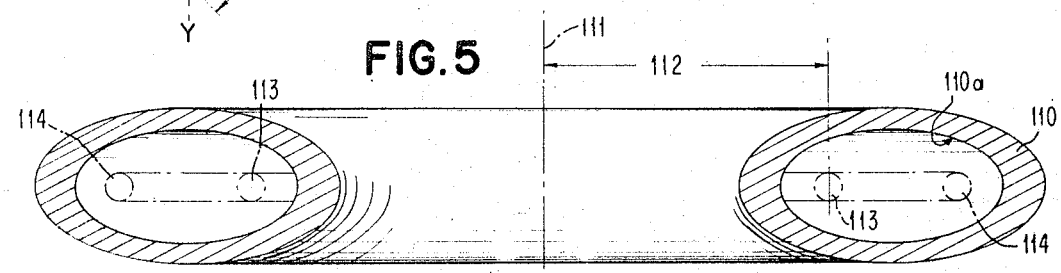

United States Patent Office 3,354,405
Patented Nov. 21, 1967

3,354,405
ENERGY COUPLING DEVICE
Herbert B. Bebb, Peekskill, and Robert J. Potter, Ossining, N.Y., assignors to International Business Machines Corporation, New York, N.Y., a corporation of New York
Filed Aug. 24, 1962, Ser. No. 219,323
2 Claims. (Cl. 331—94.5)

This invention relates to energy coupling devices and more particularly to an improved geometric configuration for coupling the excitation energy to an optical maser device.

The efficiency of an optical maser system is greatly influenced by the selection of a resonant structure and the method of coupling the source of excitation energy to the maser material. The choice of geometry is, therefore, an important factor in the success of solid state masers. While it has been recognized that optical fibers and other small diameter maser rods offer increased maser action efficiency, in that less of the spontaneous emission is absorbed by the undesired modes, the long length and small diameters of these elements makes the energy coupling, or pumping, more difficult. However, the inherent flexibility of the fibers and the ease with which glass rods may be heat formed without destroying their capability to respond with the emission characteristic of the maser, make it possible to form the active maser element in a circular configuration. This configuration of the maser element not only makes it possible to provide a closed loop in the maser element resulting in regeneration of the stimulated emission by direct transmission through the abutting ends of the active maser material, but also permits more efficient energy coupling between the maser element and the source of excitation energy. This coupling efficiency is achieved by enclosing the maser element and the excitation source within a hollow reflector formed as the surface of revolution of an ellipse revolved about an axis through only one of its focal points, the circular maser element being disposed along the locus of the rotated focal point, and the excitation source being disposed at the fixed focal point on the axis of revolution. Conversely, with the same geometric reflector, the energy from a circular excitation source may be coupled to an active maser element disposed at the fixed focal point to achieve an efficient energy coupling between the source and the energy absorptive device, namely, in this instance, the active maser element.

It is, therefore, an object of this invention to provide an improved energy coupling apparatus for focusing energy from a point source to a circular target.

Another object is to provide an improved energy coupling apparatus for focusing energy from a circular source to a point target.

A further object is to provide an improved energy coupling apparatus for focusing energy from a circular source to a circular target.

A further object is to provide an improved energy coupling apparatus for focusing the excitation energy from a point energy source to a maser device disposed in circular configuration.

Yet another object is to provide an improved energy coupling apparatus for focusing the excitation energy from a circular energy source to a master device having a configuration approaching the dimensions of a point.

Still another object is to provide a maser device wherein the active maser device is in the form of a long fiber arranged in circular configuration and the excitation energy source is disposed as a point source at the center of the circle with a geometric reflector provided to concentrate the excitation energy on the maser device.

An even further object is to provide an optical maser device employing fiber maser elements arranged in circular array so as to produce a regeneration of light transmission within the maser element without the use of terminal reflection.

A final and specific object of this invention is to provide an optical maser apparatus employing a point light source and an optical maser element formed in circular configuration enclosed in a hollow reflector whose reflecting surface is the surface of revolution of an ellipse revolved about an axis through one only of its focal points, the light source being disposed at the fixed focal point, and the active maser element being disposed along the circular locus of the rotated focal point of the ellipse during its revolution to generate the surface of revolution.

The foregoing and other objects, features and advantages of the invention will be apparent from the following more particular description of preferred embodiments of the invention, as illustrated in the accompanying drawings.

In the drawings:

FIG. 5 is an energy coupling apparatus for coupling energy from a circular source to a circular target.

FIG. 6 is a sectional view of the energy coupling device employing a circular source of excitation energy and a small maser element.

FIG. 7 is a geometric figure showing the revolution of the ellipse to generate the surface of revolution.

FIG. 8 is an alternative reflector shape employing multiple surfaces of revolution.

Figure 1:
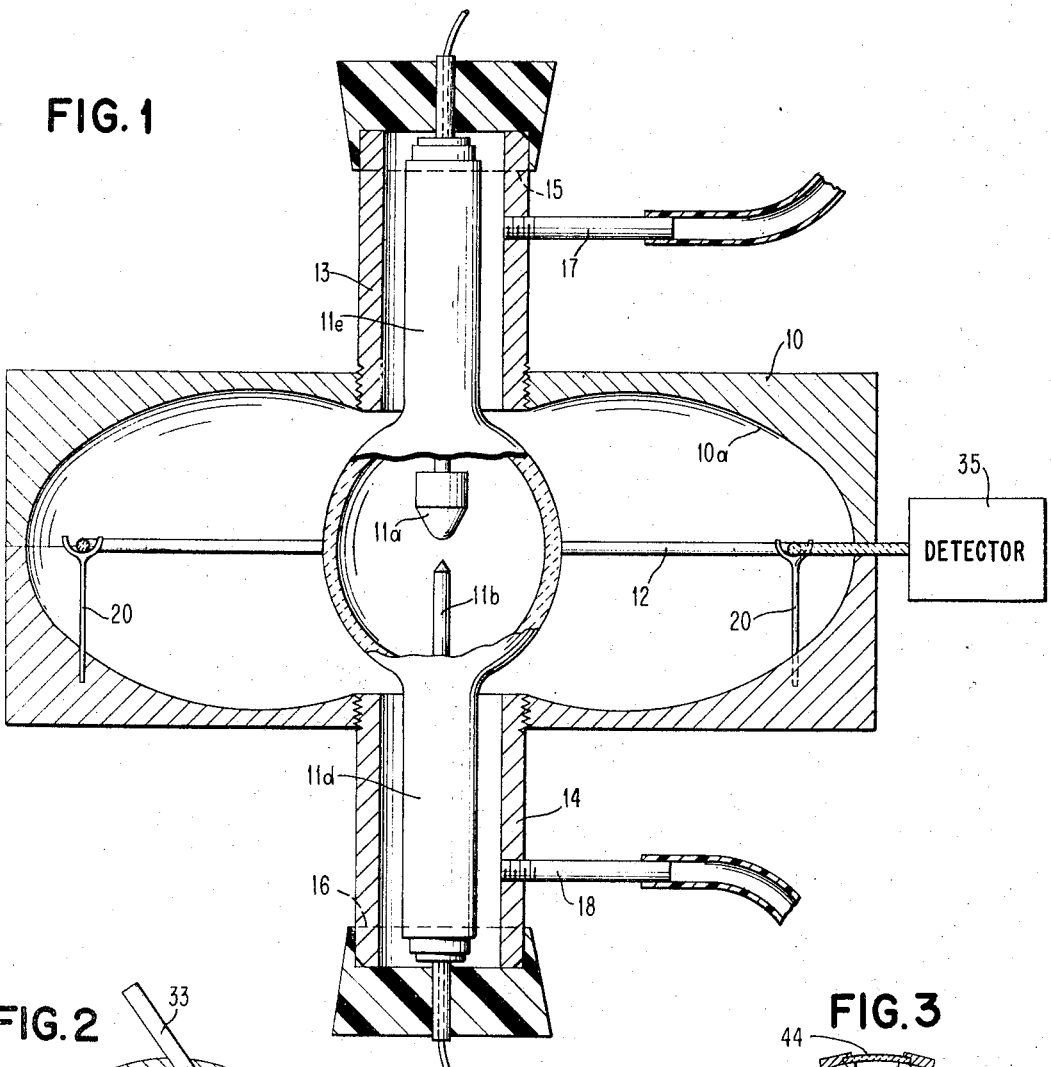
FIG. 1 is a sectional view of the energy coupling device employing a point source of excitation energy and a circular maser element.

The embodiment of the invention for exciting a fiber optic or glass rod maser formed in a circular configuration from a point source of radiation is shown in FIG. 1. Here, except for non-symmetrical disposition of some minor elements of the system, the sectional view is typical of any section that might be taken through the centerline, because of the symmetry of the system. The housing 10, having the highly polished interior reflecting cavity, is fabricated of an easily machined, dimensionally stable material, and serves both to focus the radiant energy from the light source 11 on the active maser element 12 as well as to confine a coolant fluid. The reflecting surface 10a has the configuration of an elliptical surface of revolution whose geometry will hereinafter be described in greater detail. The housing 10 is cut away in its central region and two cylindrical necks 13 and 14 affixed thereto concentric with the axis of symmetry of the reflective cavity 10a. The tubular housings 13 and 14 provide clearance for the necks 11d and 11e of the light source 11, which is fixed concentric with the axis of symmetry by the yokes 15 and 16, which yokes also seal the housing necks 13 and 14 against leakage of coolant fluid, circulated through the piped connections 17 and 18.

The active maser element 12 is supported within the reflective cavity 10a by spaced stanchions 20, which fix the location thereof along the circular locus of the second focal point. The active maser element 12 comprises either multiple turns of a single fiber, a fiber bundle coiled in multiple turns, or a solid glass maser element bent in circular configuration. Because the light source 11, including the electrodes 11a and 11b, produces an arc discharge having a size appreciably greater than a point, the focused energy falling on the locus of second focal point defines a toroidal shape rather than a circle. Thus, the fiber bundle or glass rod may have an appreciable cross-sectional area and still be uniformly illuminated. Since, by the very definition of an ellipse, all rays originating at one focal point are focused on the second focal point, substantially all of the light radiated from the light source 11 is focused on the toroidal or circular maser 12 with sufficient energy to excite the element to emit its characteristic coherent radiation.

Figure 2:
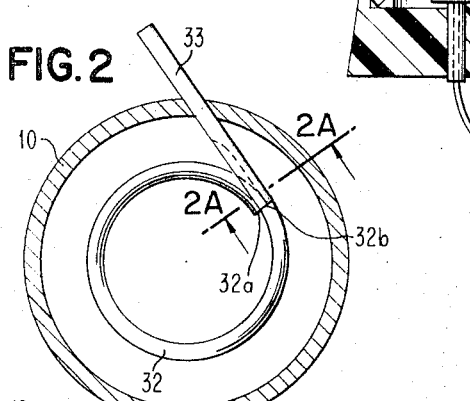
FIG. 2 is a schematic plan view of one form of the maser element of FIG. 1.
Figure 2A:
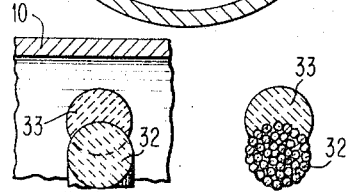
FIGS. 2A and 2B are sections taken in the direction indicated in FIG. 2 by the section arrows.
Figure 2B:
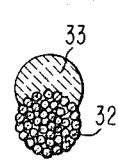

While the active circular maser element 12 in FIG. 1 has been described in general terms, it is not apparent from the sectional view of FIG. 1 how the various alternative constructions of the element 12 are employed in the reflector 10. In FIG. 2, for example, the maser element 32 is essentially circular, the departure from a circle occurring in the region wherein the ends 32a and 32b of the maser element abut one another in misaligned relationship so as to produce a step or offset in the circular array. The element 32 is preferably fabricated of glass (although other materials can be used) and may be a solid bent rod, as in FIG. 2A, or a bundle of fibers, as shown in FIG. 2B. In both instances, that portion of the ends of the element permit the emission which is stimulated within the element to be transmitted through the abutting ends of the rod or fibers, resulting in a reinforcement of the stimulated emission without any phase shift. The radiant energy which escapes through the nonabutting portion of the end surface 32b is piped through the glass rod 33 which is fixed with an end surface thereof abutting the surface 32b. This rod 33 is led through an aperture in the housing 10 so as to pipe the stimulated emission originating in the active maser element 32 external of the housing for utilization in a detection device (shown schematically at 35 in FIG. 1). To provide a maximum abutting area between the light pipe 33 and the end 32b of the active maser element, a semi-circular keyway is formed in the pipe 33 as is shown in the sections FIG. 2A or FIG. 2B.

Figure 3:
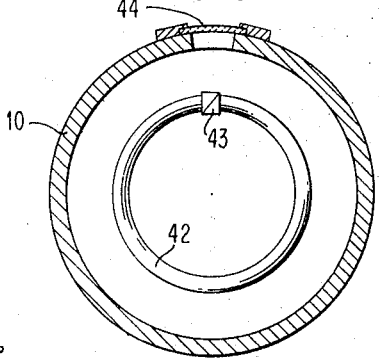
FIG. 3 is another form of the maser element of FIG. 1.

A further construction made possible by the circular configuration of the active maser element is shown in FIG. 3. Here the maser element 42 is fabricated from a solid rod, or a bundle of fibers, with the ends thereof aligned, but with a beam splitting device 43 interposed between the ends. This beam splitter, as is well known in the art, permits some of the radiant energy to be transmitted and some to be reflected. With the 45° orientation of the partial reflector surface illustrated, the reflected radiation will pass radially out of the reflector housing 10 through a windowed opening 44, or it may be piped out by a glass rod. The radiation transmitted through the beam splitter 43 again serves to reinforce the stimulated emission within the active maser element 42, which reinforcement is characteristic of the circular configuration.

Figure 4:
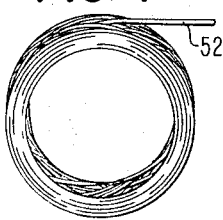
FIG. 4 is another form of the maser element of FIG. 1.

A further construction is shown in FIG. 4 wherein a single fiber (or a bundle of fibers) 52 is coiled upon itself and one end thereof led tangentially off the coil and through an opening in the housing 10. The coil, although it is not apparent in FIG. 4, has its turns assembled in a bundle substantially circular in cross-section and would comprise a number of turns such that the toroid thus formed would be evenly illuminated by the defocused light source. In this and in the other fiber configurations some of the stimulated emission escapes outwardly of the fibers, and because of the multi-fiber construction, this scattered emission enters the adjacent fibers and assists in their stimulation. The internal reflections within the fibers of that energy impinging on the boundaries of the fibers at less than the critical angle, however, directs a substantial amount of the energy in a general axial direction. Because of the small diameters less spontaneous emission is lost in undesired vibration modes.

The advantages of the circular active maser configuration and the focusing properties of an elliptical reflector are combined in a further embodiment illustrated in FIG. 5. Here, instead of the reflector 110 being formed, as in the preceding embodiments by revolving the ellipse about an axis through one of its focal points, the reflecting cavity 110a is generated by revolving an ellipse about an axis 111 spaced a distance 112 from one of the focal points 113 of the ellipse, the axis of revolution being perpendicular to the major axis of the ellipse. Each of the focal points 113 and 114 will now trace a circular locus, and the reflecting cavity will be generally toroidal in shape, with the exception that the cross section, instead of being circular will be elliptical. With this elliptical toroidal reflector shape, the active maser element may be disposed in circular configuuration along the locus of the focal point 113 and a circular tubular light source disposed along the circular locus of the focal point 114. Conversely, the positions of the active maser element and the light source can be reversed to place the maser element along the larger circle. In either arrangement the active maser element will be constructed, supported, and its radiation piped externally of the reflecting cavity 110a as previously described with respect to FIGS. 2, 2A, 2B, 3, and 4. By this construction, the closed loop regeneration of the stimulated emission will be preserved, and the efficiency of the ellipse as a focusing geometry will be advantageously employed. By the same geometric principles, the pumping energy of the circular light source will be focused on the circular maser element with a high degree of efficiency to cause the active maser element to be stimulated to emit the radiation characteristic of the maser.

In all of the preceding embodiments the radiation source has been disposed on the axis of revolution and the radiation target has been arrayed along the circle which is the locus of the second focal point. The converse of this arrangement is shown in FIG. 6. Here the light source 60 is circular in configuration and is disposed along the locus of the second focal point. The active maser element 61 is now arranged on the axis of revolution, so that the light produced by the circular light source will be focused on the first focal point on the axis of revolution. If the light source 60 has an appreciable cross-sectional area (relative to a point), the focused radiation will include a volume sufficient to encompass a solid state maser device, such as, for example, a ruby maser having a diameter in the order of magnitude of ¼ inch and a length of ½ inch, the length thereof being disposed along the axis of revolution of the elliptical surface of revolution. The coherent radiation from the maser element is directed along the axis of revolution and led axially out of the housing through a window in the cylindrical neck, or by the solid light pipes 63 and 64, as shown in FIG. 6. These pipes, in addition to piping the radiation out of the housing 10, also fix the location of the maser element 61. The remaining elements, including the closures 15 and 16, and the coolant connections 17 and 18 serve the same functions as described with respect to FIG. 1.

While an elliptical surface of revolution has been employed in the description of several of the embodiments to define the shape of the energy focusing cavity, the details of its geometry have not been explained. In any ellipse, by the very definition thereof, all rays originating at one focal point will be focused on the second focal point. By extrapolation, therefore, if the plane ellipse is rotated about an axis through one of the focal points, the second focal point will trace out a circular path as a locus, provided the axis of revolution does not coincide with the major axis of the ellipse, and all rays originating at the focal point on the axis of revolution will be focused on the circular locus of the second focal point. Conversely, all rays originating from a circular source disposed along the locus of the second focal point will be focused on the other focal point on the axis of revolution.

The relationship of the ellipse to the axis of revolution can be conveniently seen with reference to FIG. 7, wherein, for convenience, the first focal point of the ellipse is located at the origin of the X and Y axes, and the axis of revolution coincides with the Y—Y axis. The major axis of the ellipse subtends an angle $\alpha$ with respect to the Y—Y axis. The surface of revolution is generated by revolving that portion of the elliptical curve to the right of the Y—Y axis about that axis as an axis of revolution. If the semimajor axis of the ellipse is equal to $a$ and the semiminor axis equals $b$, then the distance between the focii is $2\sqrt{a^2-b^2}$. The radius of the circular locus swept by the second focal point is therefore:

$$R = 2\sqrt{a^2-b^2} \sin \alpha$$

If $\alpha=0$, the $\sin \alpha=0$, and the radius becomes zero. When $\alpha=90°$, and $\sin \alpha=1$, the radius becomes a maximum at $2\sqrt{a^2-b^2}$. In the structural embodiments illustrated in FIGS. 1 and 6, the angle $\alpha$ between the axis of revolution and the major axis was taken as 90°. In the other limit (where $\alpha=0°$) the surface of revolution becomes an ellipsoid, and since the axis of revolution coincides with the major axis of the ellipse, the second focal point remains fixed at a point, thus precluding the use of either a circular active maser element and a point light source, or the converse circular light source and substantially point maser element.

Between the limits of $\alpha=0°$ and $\alpha=90°$, a further modification arises. For example, if $\alpha=45°$ and 135°, then two ellipses may be rotated to produce a cavity whose cross-section is a four-cusped figure such as that shown in FIG. 8. If a point light source is located on the focal point 100 disposed at the origin then two active maser elements disposed along the loci of the revolving focal points 101 and 102 can be simultaneously stimulated by a common point light source. Conversely, two circular light sources disposed along the loci of the rotated second focal points 101 and 102 will have their radiant energy focused on the focal point common to both rotated ellipses. Other multicusped ellipses of rotation may be similarly constructed.

While some indication of the size of components has been alluded to, no specific details thereof have been given. For an operative embodiment, the reflective surface 10a of the embodiments of FIG. 1 or FIG. 6 has a semimajor axis of 2.76 inches and a semiminor axis of 2.67 inches. Since the radius of the locus of the rotated focal point has been represented by the formula $$R = 2\sqrt{a^2-b^2}$$

then, by substitution and solution, the diameter of the circular maser element 12 or the circular light source 60 will be found to be about 2.8 inches or 7 cm. (approximately). The circular maser elements is fabricated of a barium crown glass doped with approximately 2% by weight of neodymium chloride ($Nd_2Cl_3$). The fibers are in the order of magnitude of 8 microns in diameter and are clad with a coating of glass having a thickness of approximately 50 microns. The fiber bundles of any one of the described embodiments are comprised of as many as 2,000 individual fibers. The solid glass rod, of the same composition and cladding, may have a cross sectional diameter in the region of 5 mm. and still be adequately stimulated by the energy focused in a reflector having the above dimensions. The arc discharge lamp is a commercially available mercury xenon type of 2500 watt capacity. With these as exemplary parameters a system employing the neodymium doped glass will emit the coherent radiation characteristic of the optical maser at a wavelength of 1.06 angstroms.

While the invention has been particularly shown and described with reference to preferred embodiments thereof, it will be understood by those skilled in the art that various changes in form and details may be made therein without departing from the spirit and scope of the invention.

What is claimed is:
1. A maser system comprising:
 (a) a reflector having a reflecting surface defined as that surface of revolution generated by revolving a plane elliptical curve enclosing a first focus of the ellipse and subtended by a line through the second focus of the ellipse about that line as an axis of revolution, the line and the major axis of the ellipse subtending an angle greater than zero degrees, whereby said first focus traces a circular locus,
 (b) a high intensity substantially point source of excitation energy disposed within said reflector at said second point of focus,
 (c) an elongated active maser element formed in a substantially circular configuration with the ends thereof abutting one another in misaligned relationship disposed along the circular locus of said first focal point,
 (d) and a light pipe abutting one of the offset ends of said element and extending through said reflector.
2. A maser system comprising:
 (a) a reflector having a reflecting surface defined as that surface of revolution generated by revolving a plane elliptical curve enclosing a first focus of the ellipse and subtended by a line through the second focus of the ellipse about that line as an axis of revolution, the line and the major axis of the ellipse subtending an angle greater than zero degrees, whereby said first focus traces a circular locus,
 (b) a high intensity substantially point source of excitation energy disposed within said reflector at said second point of focus,
 (c) a beam splitting device disposed on the circular locus of said first focal point and operative to transmit light in a direction tangential to said circle and reflect light in a path radial to said circle,
 (d) an elongated active maser element formed in a substantially circular configuration with the ends thereof abutting said beam splitting device, and disposed along said circular locus,
 (e) and means for transmitting light radially reflected by said beam splitting device out of said reflector.

References Cited

UNITED STATES PATENTS

| | | | |
|---|---|---|---|
| 2,342,115 | 2/1944 | Blauvelt | 240—41.1 |
| 3,102,953 | 9/1963 | Wallace | 88—1 |
| 3,223,944 | 12/1965 | Luck et al. | 331—94.5 |

FOREIGN PATENTS

| | | |
|---|---|---|
| 591,964 | 2/1960 | Canada. |
| 484,199 | 4/1938 | Great Britain. |

OTHER REFERENCES

Bowness et al.: "A High-Energy Laser Using a Multi-Elliptical Cavity," Proc. of the IRE, vol. 50, No. 7, July 1962, pp. 1704 to 1705.

Ciftan et al.: "A Ruby Laser With an Elliptic Configuration," Proc. of the IRE, vol. 49, No. 5, May 1961, pp. 960 and 961.

Snitzer: "Proposed Fiber Cavities for Optical Masers," Journal of Applied Physics, vol. 32, No. 1, January 1961, pp. 36 to 39.

Snitzer: "Optical Maser Action of $Nd^{+3}$ in a Barium Crown Glass," Phys. Rev. Letters, vol. 7, No. 12, Dec. 15, 1961, pp. 444 to 446.

Wentz: "8-Inch Ruby Amplifier," Proc. of the IRE, vol. 50, No. 6, June 1962, pp. 1528 and 1529.

JEWELL H. PEDERSEN, *Primary Examiner.*

RONALD L. WIBERT, *Examiner.*

J. L. CHASKIN, *Assistant Examiner.*